United States Patent
Toyohara et al.

(10) Patent No.: US 8,814,735 B2
(45) Date of Patent: Aug. 26, 2014

(54) METAL V-BELT OF CONTINUOUSLY VARIABLE TRANSMISSION

(75) Inventors: Kouhei Toyohara, Sagamihara (JP); Kazuhiro Mizumiya, Kawasaki (JP); Yoshitaka Miura, Yokohama (JP); Tsutomu Kamitani, Ebina (JP); Shinji Kiyohara, Ebina (JP)

(73) Assignee: Jatco Ltd, Fuji-shi (JP)

( * ) Notice: Subject to any disclaimer, the term of this patent is extended or adjusted under 35 U.S.C. 154(b) by 935 days.

(21) Appl. No.: 12/437,346

(22) Filed: May 7, 2009

(65) Prior Publication Data

US 2009/0280940 A1 Nov. 12, 2009

(30) Foreign Application Priority Data

May 12, 2008 (JP) ................................. 2008-124230

(51) Int. Cl.
*F16G 1/21* (2006.01)
*F16G 1/22* (2006.01)
*F16G 5/16* (2006.01)

(52) U.S. Cl.
USPC ......................................... 474/242; 474/244

(58) Field of Classification Search
USPC ........................... 474/242, 249, 250, 251, 201
See application file for complete search history.

(56) References Cited

U.S. PATENT DOCUMENTS

| | | | | |
|---|---|---|---|---|
| 1,028,783 A | * | 6/1912 | Von Rabenau | 474/251 |
| 1,966,831 A | * | 7/1934 | Torrence et al. | 474/40 |
| 4,581,000 A | * | 4/1986 | Ferfecki | 474/201 |
| 5,004,450 A | * | 4/1991 | Ide | 474/242 |
| 5,011,461 A | * | 4/1991 | Brouwers | 474/188 |
| 6,045,474 A | * | 4/2000 | Smeets et al. | 474/249 |
| 6,440,024 B1 | * | 8/2002 | Kobayashi | 474/242 |
| 6,537,166 B1 | * | 3/2003 | Adriaenssens et al. | 474/8 |
| 6,599,212 B2 | * | 7/2003 | Kanokogi et al. | 474/242 |
| 6,641,471 B1 | * | 11/2003 | Pinheiro et al. | 451/526 |
| 6,705,963 B2 | * | 3/2004 | Smeets et al. | 474/242 |
| 6,830,525 B1 | * | 12/2004 | Brandsma et al. | 474/242 |
| 6,893,370 B2 | * | 5/2005 | Kobayashi | 474/242 |
| 7,066,858 B2 | * | 6/2006 | Smeets | 474/242 |
| 7,066,859 B2 | * | 6/2006 | Brandsma et al. | 474/242 |
| 7,261,656 B2 | * | 8/2007 | Sakai | 474/242 |

(Continued)

FOREIGN PATENT DOCUMENTS

| | | |
|---|---|---|
| EP | 1 199 494 A2 | 4/2002 |
| EP | 1 662 174 A1 | 5/2006 |

(Continued)

*Primary Examiner* — Michael R Mansen
*Assistant Examiner* — Henry Liu
(74) *Attorney, Agent, or Firm* — Foley & Lardner LLP

(57) ABSTRACT

Each steel element for a V-belt of a continuously variable transmission has a flank (4*a*) that comprises a plurality of equally spaced raised portions (41) each being placed between two fine grooves (42). A flat flatness ratio (FR) given by the equation (1) is set to the highest one of values that are capable of practically machining the flank (4*a*) of the steel element (4) and capable of causing the flank (4*a*) to exhibit a given and satisfied lubrication oil discharging effect, and a groove pitch (GP) that is a distance between the two fine grooves (42) is set to a value that is capable of practically machining the flank of the steel element and capable of causing the flank to exhibit a given and satisfied lubrication oil discharging effect. The groove pitch thus set is a value that is permitted by the higher value of the flatness ratio thus set.

$$FR(\%) = WRP/(WRP+WG) \times 100 \qquad (1)$$

wherein:
FR: Flatness ratio
WRP: Width of the raised portion (41)
WG: Width of the groove (42).

13 Claims, 5 Drawing Sheets

(56) References Cited

U.S. PATENT DOCUMENTS

| | | | |
|---|---|---|---|
| 2002/0052261 A1* | 5/2002 | Kanokogi et al. | 474/242 |
| 2002/0183152 A1* | 12/2002 | Kobayashi | 474/242 |
| 2004/0053723 A1* | 3/2004 | Smeets | 474/242 |
| 2004/0072644 A1* | 4/2004 | van Lith et al. | 474/242 |
| 2004/0176202 A1* | 9/2004 | Sakai | 474/242 |
| 2005/0059519 A1* | 3/2005 | Brandsma et al. | 474/242 |
| 2005/0221938 A1* | 10/2005 | Yoshida et al. | 474/242 |
| 2006/0135306 A1* | 6/2006 | Hattori et al. | 474/242 |

FOREIGN PATENT DOCUMENTS

| | | |
|---|---|---|
| JP | 10-213185 A | 8/1998 |
| JP | 2005-321090 A | 11/2005 |
| JP | 2006-153046 A | 6/2006 |

\* cited by examiner

Prior Art
FIG.7A
Prior Art
FIG.7B
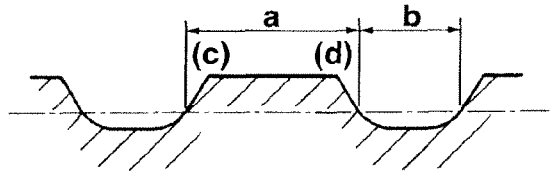
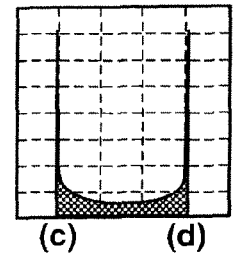
AREA RATIO BETWEEN RAISED
PORTION AND GROOVE PORTION
a:b=50~60:40~50
Prior Art
FIG.8A
Prior Art
FIG.8B
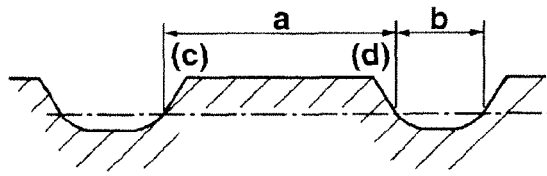
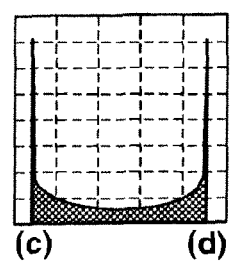
AREA RATIO BETWEEN RAISED
PORTION AND GROOVE PORTION
a:b=80~90:10~20
FIG.9
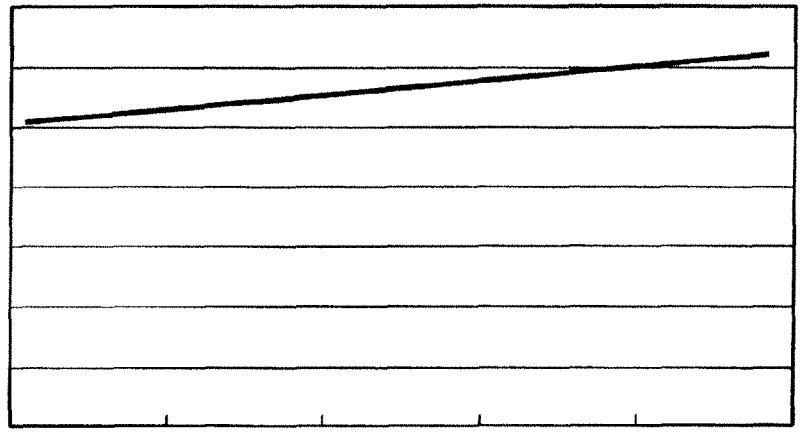

- - - - KNOWN STEEL ELEMENT
——— STEEL ELEMENT OF INVENTION

◇ KNOWN STEEL ELEMENT
☐ STEEL ELEMENT OF INVENTION

METAL V-BELT OF CONTINUOUSLY VARIABLE TRANSMISSION

BACKGROUND OF THE INVENTION

1. Field of the Invention

The present invention relates in general to a belt-type continuously variable transmissions, and more particularly to metal V-belts used by such continuously variable transmissions. More specifically, the present invention is concerned with improvements through which a torque transmission efficiency of the belt is increased.

2. Description of the Related Art

Hitherto, various metal V-belts have been proposed and put into practical use in the field of wheeled motor vehicles that employ the belt-type continuously variable transmissions.

One of them is the metal V-belt disclosed in Japanese Laid-open Patent Application (tokkaihei) 10-213185. The metal V-belt disclosed in this published Application comprises a plurality of steel elements attached consecutively to two laminated steel bands. For such consecutive attaching, the steel elements have opposed grooves (or saddle grooves) that receive inside portions of the laminated steel bands respectively. Each steel element has at tapered flanks thereof, which are in contact with mutually opposed conical faces (or sheave surfaces) of drive and driven pulleys, a plurality of fine grooves. Due to provision of such fine grooves, lubrication oil is easily and effectively discharged in a circumferential direction of the pulleys.

The other one of the hitherto proposed metal V-belts is disclosed in Japanese Laid-open Patent Application (tokkai) 2005-321090. In this V-belt, there is provided means through which a frictional coefficient of the face of the belt in contact with the conical faces of a drive or driven pulley is improved. Actually, with such means, under operation of the transmission, there is effectively produced a protecting film of lubrication oil between flank surfaces of the steel elements and the conical faces of the drive and driven pulleys. Actually, the protecting film is composed of a torque transmission film that is adsorbed by additive components of lubrication oil and exhibits a shearing force and a lubrication film that serves as a lubricant. The flank surfaces of each steel element are formed with fine grooves by which supplied lubrication oil is appropriately discharged under operation of the transmission.

SUMMARY OF THE INVENTION

However, in the above-mentioned V-belts hitherto proposed, due to the nature of the fine grooves formed on the flank surface of the steel element, the frictional contact of the flank surface with the conical faces of the drive and driven pulleys fails to exhibit satisfied contact characteristics. Actually, in the above-mentioned V-belts hitherto proposed, raised portions and grooves formed on the flank surface of the steel element have an area ratio of about 40-50:50-60. Measuring a bearing pressure distribution of the flank surface having such area ratio has revealed that a middle portion of each raised portion is subjected to an excessively high bearing pressure, which is of course undesirable.

Furthermore, if the above-mentioned V-belts are employed in a heavy duty continuously variable transmission without making suitable improvement to the V-belt or to the pulleys, undesirable phenomena tend to occur, which are, for example, remarkable abrasion of the flank surfaces of the steel elements. As is known, when the flank surface is remarkably abraded, the fine grooves of the flank surface reduce their oil holding capacity, which deteriorates the lubrication oil discharging effect.

As is known, the protecting film of lubrication oil produced between contact surfaces of the belt and pulley is not so hard. Thus, if, due to a partial concentration of bearing pressure, the flank surfaces of the steel elements are subjected a marked bearing pressure thereby producing an excessive shearing force, the protecting film is damaged, which causes failure of producing a desired frictional force.

Accordingly, it is an object of the present invention to provide a metal V-belt of a continuously variable transmission, which is free of the above-mentioned drawbacks.

That is, in accordance with the present invention, there is provided a metal V-belt of a continuously variable transmission, which provides increase in contact area between the belt and the pulley and thus assures a long use of the transmission through which a high torque transmission is kept.

In accordance with a first aspect of the present invention, there is provided a metal V-belt "V" for transmitting torque between two pulleys (1, 2) each having a V-shaped groove, the metal V-belt including a plurality of identical steel elements (4) that are held by parallelly extending laminated steel bands (3, 3), the steel element comprising a flank (4a) capable of making frictional contact with the V-shaped groove for transmission of torque, wherein the flank (4a) of each steel element (4) comprises a plurality of equally spaced raised portions (41) each being placed between two grooves (42), wherein a flatness ratio (FR) given by the equation (1) is set to the highest one of values that are capable of practically machining the flank of the steel element and capable of causing the flank to exhibit a given lubrication oil discharging effect, and wherein a groove pitch (GP) that is a distance between the two grooves (42) is set to a value that is capable of practically machining the flank of the steel element and capable of causing the flank to exhibit a given lubrication oil discharging effect, the groove pitch (GP) thus set being a value that is permitted by the highest value of the flatness ratio (FR) thus set.

$$FR (\%) = WRP/(WRP+WG) \times 100 \quad (1)$$

wherein:
FR: Flatness ratio
WRP: Width of the raised portion (41)
WG: Width of the groove (42).

In accordance with a second aspect of the present invention, there is provided, in a belt-type continuously variable transmission including drive and driven pulleys (1, 2) each of which has a V-shaped groove, a V-belt (V) that is to be put around the drive and driven pulleys (1, 2) for transmitting torque from the drive pulley (1) to the driven pulley (2). The V-belt (V) includes a plurality of identical steel elements (4) that are held by parallelly extending laminated steel bands (3), each steel element (4) having a tapered flank (4a) of which surface is capable of making frictional contact with the V-shaped grooves of the drive and driven pulleys (1, 2) for transmitting torque, the surface of the tapered flank (4a) having a plurality of equally spaced raised portions (41) each being placed between two grooves (42). A flatness ratio (FR) of the surface of the tapered flank (4a) given by the equation (1) is set to the highest one of values that are capable of practically machining the tapered flank (4a) of the steel element (4) and capable of causing the tapered flank (4a) to exhibit a given lubrication oil discharging effect, and a groove pitch (GP) that is a distance between the two grooves (42) is set to a value that is capable of practically machining the flank (4a) of the steel element (4) and capable of causing the flank (4a) to exhibit a given lubrication oil discharging effect. The groove pitch (GP) thus set is a value that is permitted by the highest value of the flatness ration (FR) thus set, $$FR (\%) = WRP/(WRP+WG) \times 100 \quad (1)$$

wherein:
FR: Flatness ratio
WRP: Width of the raised portion (41)
WG: Width of the groove (42).

BRIEF DESCRIPTION OF THE DRAWINGS

Other objects and advantages of the present invention will become apparent from the following description when taken in conjunction with the accompanying drawings, in which:

FIG. 7A is a view similar to FIG. 6A, but showing the flank of the known steel element that has been subjected to a certain abrasion;

FIG. 7B is a graph showing bearing pressure distribution characteristics possessed by the steel element of FIG. 7A;

FIG. 8A is a view similar to FIG. 7A, but showing the flank of the known steel element that has been subjected to a much severe abrasion;

FIG. 8B is a graph showing bearing pressure distribution characteristics possessed by the steel element of FIG. 8A;

FIG. 9 is a graph showing a relationship between a solid contact area and a coefficient of friction;

DETAILED DESCRIPTION OF THE INVENTION

In the following, a metal V-belt of a continuously variable transmission according to the present invention will be described in detail with reference to the accompanying drawings.

Figure 1:
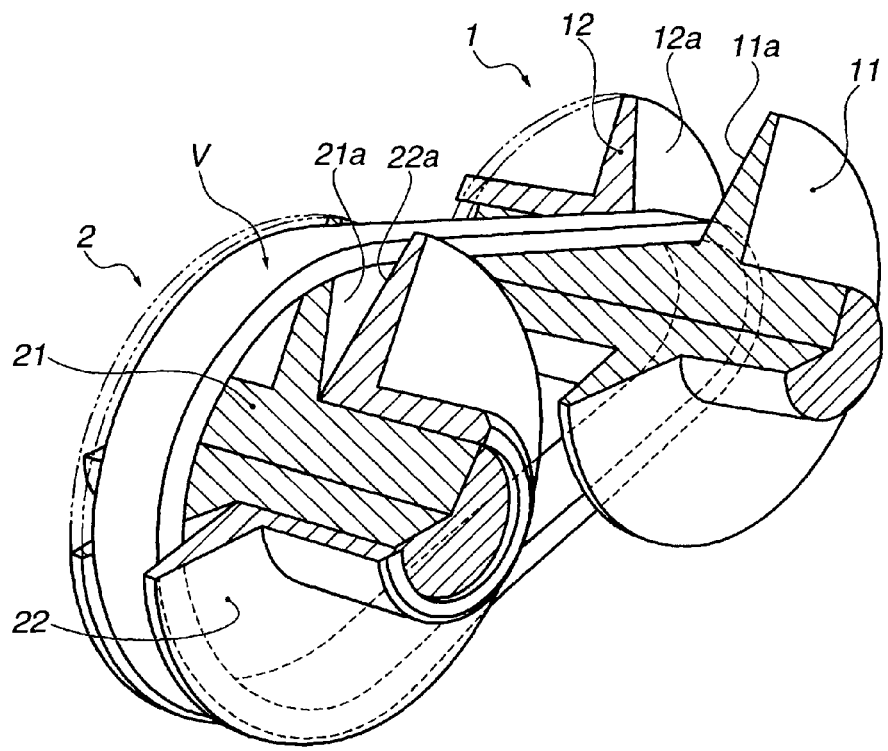
FIG. 1 is a partially cut perspective view of a belt-type continuously variable transmission to which a metal V-belt of the present invention is practically applied for establishing a maximum speed reduction state of the transmission.

Referring to FIG. 1, there is schematically shown a continuously variable transmission to which a metal V-belt "V" of the present invention is practically applied.

The transmission comprises a drive pulley 1 and a driven pulley 2 around which the metal V-belt "V" is practically put.

Under operation of an associated engine (not shown), an engine torque from a prime mover, such as internal combustion engine or the like is transmitted to the drive pulley 1 through both a torque converter (not shown) and a forward/backward movement switching mechanism (not shown). The engine torque is then transmitted through the V-belt "V" to the driven pulley 2 and then transmitted to drive road wheels (not shown) through both a reduction gear (not shown) and a drive shaft (not shown).

As shown in FIG. 1, the drive pulley 1 comprises a non-slidable disc 11 and a slidable disc 12 that is slidable toward and away from the non-slidable disc 11, and driven pulley 2 comprises a non-slidably disc 21 and a slidable disc 22 that is slidable toward and away from the non-slidable disc 21.

The non-slidable and slidable discs 11 and 12 of the drive pulley 1 have respectively opposed conical faces (or sheave surfaces) 11a and 12a to provide the drive pulley 1 with a V-shaped groove whose thickness is variable.

Like this, the non-slidable and slidable discs 21 and 22 of the driven pulley 2 have respectively opposed conical faces 21a and 22a (or sheave surfaces) to provide the driven pulley 2 with a V-shaped groove whose thickness is variable.

It is to be noted that a positional relation between the non-slidable and slidable discs 11 and 12 of the drive pulley 1 is opposite to that between the non-slidable and slidable discs 21 and 22 of the driven pulley 2. That is, in FIG. 1, the right disc (viz., non-slidable disc 11) of the drive pulley 1 is not slidable, while, the right disc (viz., slidable disc 22) of the driven pulley 2 is slidable.

As is seen from FIG. 1, when properly assembled, the V-belt "V" is wound in the V-shaped groove of the drive pulley 1 contacting at its both sides with the conical faces 11a and 12a, and is wound in the V-shaped groove of the driven pulley 2 contacting at the both sides with the conical faces 21a and 22a. Each conical face 11a, 12a, 21a or 22a has an angle of about 11 degrees.

Although not shown, the slidable discs 12 and 22 are biased toward the corresponding non-slidable discs 11 and 21 by means of a hydraulic mechanism. With such biasing force, the V-belt "V" is assuredly and operatively put in the V-shaped grooves of the drive and driven pulleys 1 and 2.

In the following, the metal V-belt "V" of the invention will be described in detail.

Figure 2:
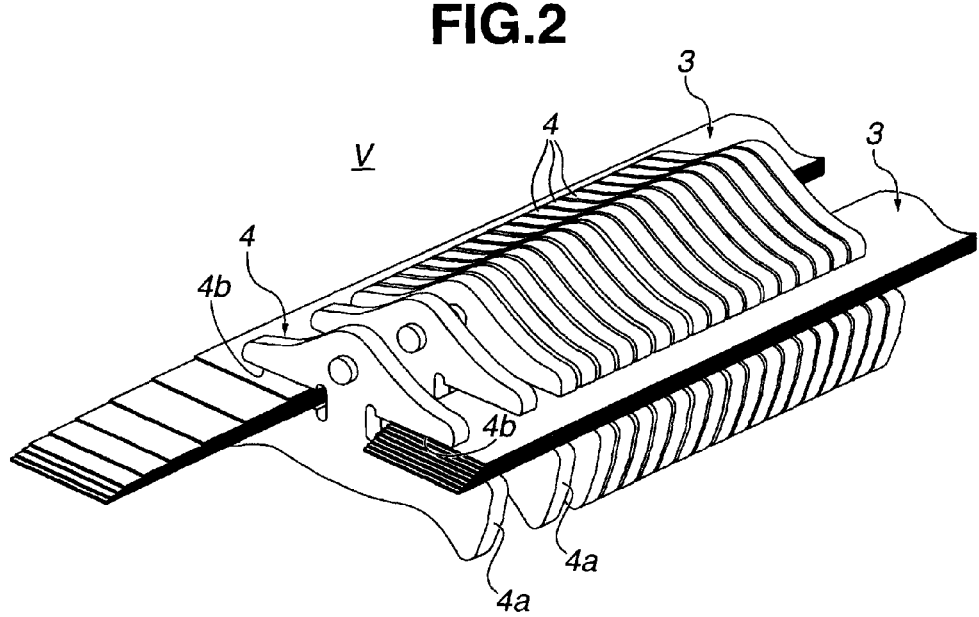
FIG. 2 is an enlarged perspective view of a part of the metal V-belt of the present invention.

As is shown in FIG. 2, the V-belt "V" comprises two parallelly extending laminated steel bands 3 and 3 and a plurality of identical steel elements 4 that are held by the two laminated steel bands 3 and 3.

Each laminated steel band 3 comprises a plurality annular rings put on one another. Preferably, the plurality of annular rings are made of a high strength steel, such as maraging steel or the like. That is, for producing the annular rings, a plurality of long and thin (about 0.2 mm) plates of such steel are prepared, and each of them is welded at opposed ends to form an annular shape. The annular rings thus produced are then put on one another to constitute the laminated steel band 3.

Actually, the long and thin plates of such steel have slightly different lengths so that the coupling of the annular rings is neatly made.

Each steel element 4 is produced by stamping out the same from a steel plate that has a thickness of about 2 mm. Each steel element 4 has opposed grooves 4b (or saddle grooves) that receive the inside portions of the laminated steel bands 3 respectively. Furthermore, each steel element 4 has a pair of tapered flanks 4a. The tapered flanks 4a have each a certain surface that is in contact with the conical faces 11a, 12a, 21a and 22a of the drive and driven pulleys 1 and 2.

As is seen from FIG. 2 and mentioned hereinabove, for producing the metal V-belt "V", a plurality of steel elements 4, which are parallelly arranged, are put between the parallelly extending laminated steel bands 3 and 3 while receiving the respective inside portions of the bands 3 in the opposed grooves (viz., saddle grooves) 4b and 4b.

As will be understood from the drawings of FIGS. 1 and 2, in use, the V-belt "V" is put around the drive and driven pulleys 1 and 2 in such a manner that a ridge portion of the V-belt "V" is directed radially outward. That is, upon proper mounting of the V-belt "V" on the drive and driven pulleys 1 and 2, opposed tapered flanks 4a and 4a of the steel elements 4 contact both the conical faces 11a and 12a of the drive pulley 1 and the conical faces 21a and 22a of the driven pulley 2.

Under travelling of the V-belt "V" around the drive and driven pulleys 1 and 2 carrying out a certain torque transmission from the drive pulley 1 to the driven pulley 2, the steel elements 4 are urged to move radially outward. Such radially outward movement of the steel elements 4 is restrained by the two laminated steel bands 3. A pressing force produced by the conical faces 11a and 12a of the drive pulley 1 and that produced by the conical faces 21a and 22a of the driven pulley 2 are supported by the steel elements 4.

In the following, the detail of each steel element 4 will be described with the aid of the drawings.

Figure 3A:
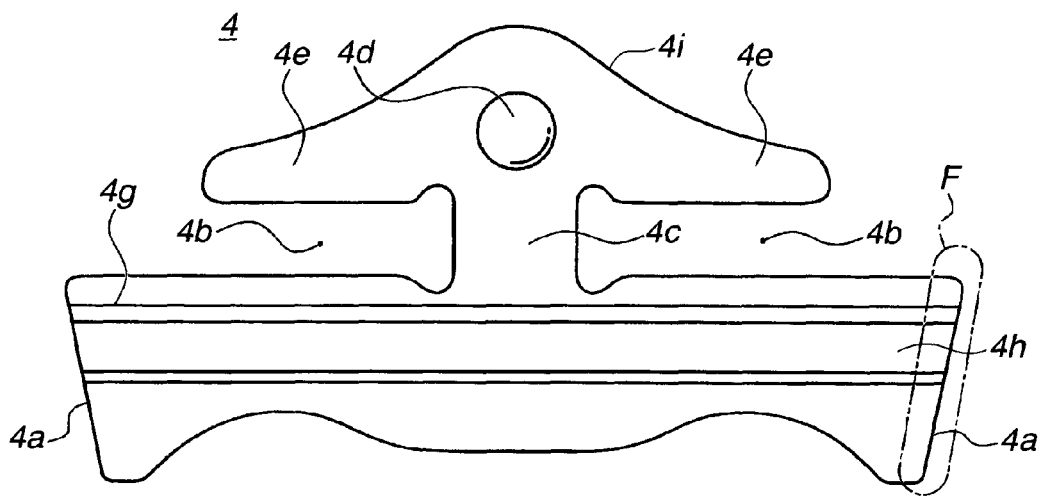
FIG. 3A is a front view of a steel element that is an element of the V-belt of the present invention.
Figure 3B:
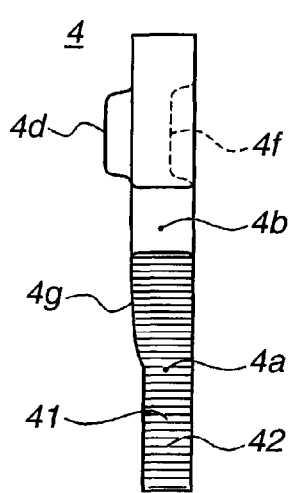
FIG. 3B is a side view of the steel element of FIG. 3A.

As is seen from FIGS. 3A and 3B, the steel element 4 comprises a larger base portion 4h that has a pair of tapered flanks 4a and 4a at lateral ends thereof, a neck portion 4c that extends upward from a middle portion of the larger base portion 4h, a head portion 4i that is formed on a top of the neck portion 4c, a pair of ear portions 4e and 4e that are formed at lateral lower ends of the head portion 4i and a pair of opposed grooves (or saddle grooves) 4b and 4b each of which is defined by the base portion 4h, the neck portion 4c and the ear portion 4e.

As is seen from the drawings, the steel element 4 further comprises a nose portion 4d that is formed on a center of one surface of the head portion 4d and a recess 4f that is formed on the other surface of the head portion 4d at a position just behind the nose portion 4d. The larger base portion 4h has a locking edge 4g formed on one side surface thereof.

Figure 3C:
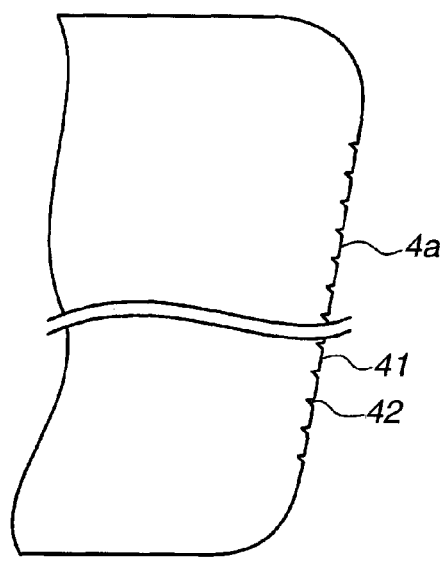
FIG. 3C is an enlarged view of a flank of the steel element, that is indicated by reference "F" in FIG. 3A.

As is shown in FIGS. 3B and 3C, each of the tapered flanks 4a and 4a has a certain surface that is machined in a certain manner as will be described in detail hereinafter.

Under operation of the transmission, the respective surfaces of the tapered flanks 4a and 4a of each steel element 4 are brought into contact with the opposed conical faces 11a and 12a of the drive pulley 1 and those 21a and 22a of the driven pulley 2. The opposed grooves (saddle grooves) 4b and 4b are sized to put therein respective inside parts of the two laminated steel bands 3 and 3.

The nose portion 4d faces forward, that is, the direction in which the V-belt "V" travels.

As will be understood from FIGS. 3B and 3C, each of the respective surfaces of the tapered flanks 4a of each steel element 4 is formed with equally spaced fine grooves 42 by which equally spaced raised portions 41 are defined, as is best seen from FIG. 3C. That is, each raised portion 41 is placed between two fine grooves 42.

Actually, the raised portions 41 of each tapered flank 4a contact the conical faces 11a and 22a of the drive and driven pulleys 1 and 2 (or the conical faces 12a and 21a of the drive and driven pulleys 1 and 2), and the fine grooves 42 of each tapered flank 4a function to discharge the lubrication oil in a circumferential direction of the pulley 1 or 2.

In the following, the detail of the fine groove 42 and raised portion 41 will be described with the aid of FIGS. 4 and 5.

Figure 4:
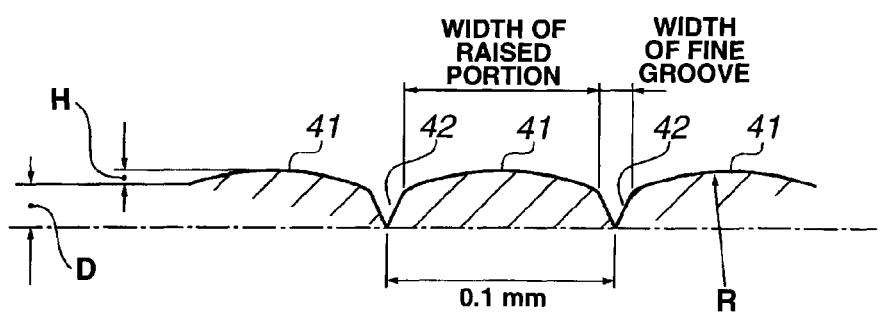
FIG. 4 is an enlarged sectional view of a flank of the steel element of FIG. 3A.

FIG. 4 shows an enlarged sectional view of the flank 4a. As is seen from this drawing, each fine groove 42 has a generally V-shaped cross section.

Figure 5:
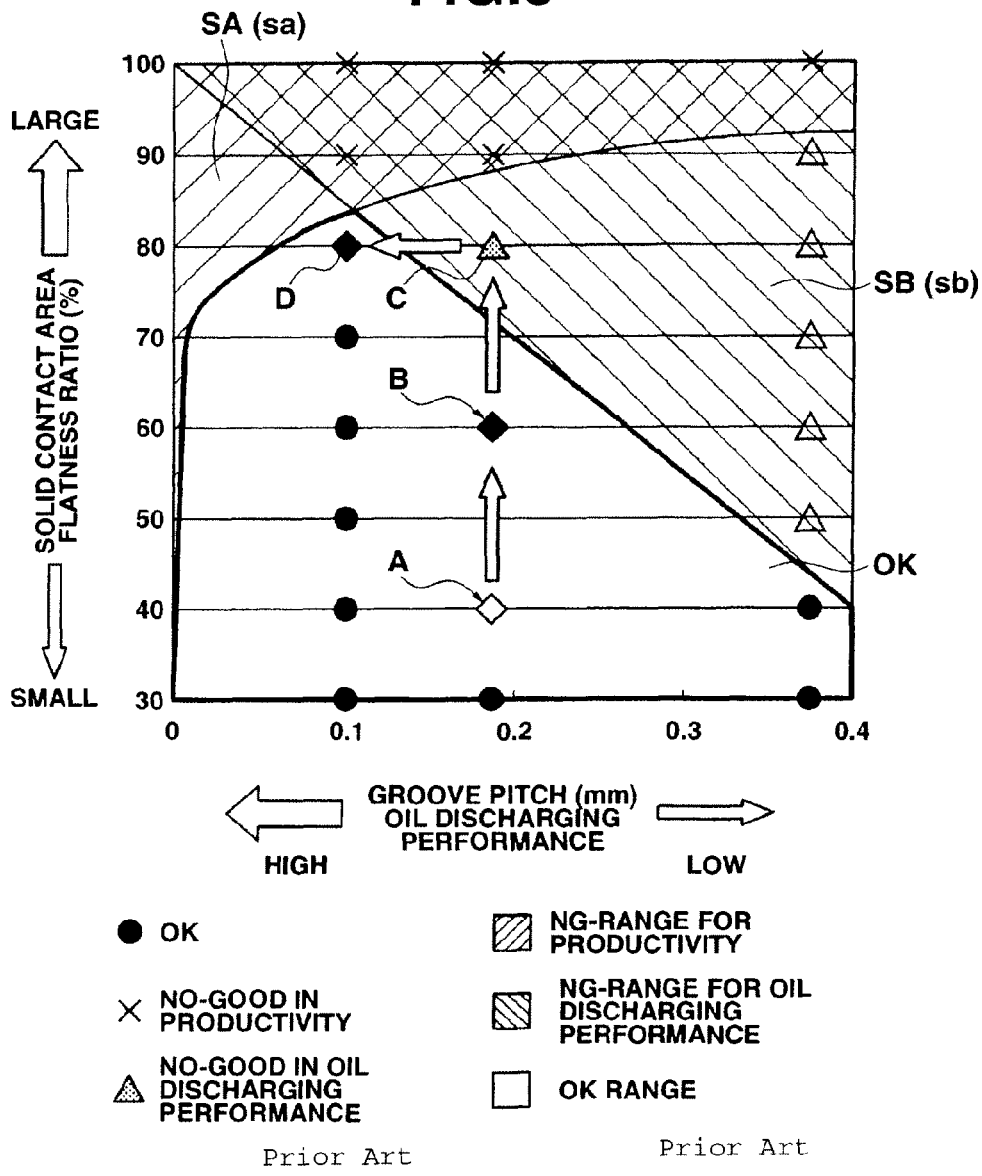
FIG. 5 is a graph showing characteristics of the steel element of the V-belt of the invention in terms of a relationship between a flatness ratio of the steel element and a groove pitch of the flank of the steel element, with respect to an easiness/difficulty in producing the steel element (viz., Good/No-Good range in productivity) and an easiness/difficulty in effective discharging of lubrication oil (viz., Good/No-Good range in oil effective discharging)

FIG. 5 is a graph showing characteristics of the steel element 4 of the V-belt "V" of the invention in terms of a relationship between a flatness ratio "FR" of the flank 4a of the steel element 4 and a groove pitch "GP" of the flank 4a of the steel element 4, with respect to easiness/non-easiness in producing the steel element (viz., Good/No-Good range for productivity) and easiness/non-easiness in obtaining effective discharging of lubrication oil (viz., Good/No-Good range for oil effective discharging).

The flatness ratio "FR" of the flank 4a of the steel element 4 is calculated by the following equation.

$$FR\ (\%) = WRP/(WRP+WG) \times 100 \qquad (1)$$

wherein:
FR: Flatness ratio
WRP: Width of the raised portion 41
WG: Width of the fine groove 42

In order to find out an optimum combination between the flatness ratio "FR" and the groove pitch "GP", a plurality of test pieces of the steel element 4, that are different in flatness ratio "FR" and groove pitch "GP", were prepared and subjected to an evaluation test that includes a test for examining the easiness/non-easiness in producing the steel element 4 (viz., Good/No-good range for productivity) and a test for examining the easiness/non-easiness in obtaining effective discharging of lubrication oil (viz., Good/No-good range for oil effective discharging).

The results of the evaluation test are shown in the graph of FIG. 5. In the graph, the groove pitch (mm) is plotted on the X-axis and the flatness ratio (FR) is plotted on the Y-axis. Furthermore, in the graph, No-good range "SA" for productivity is indicated by a zone shadowed by slanted lines "sa", and No-good range "SB" for oil effective discharging is indicated by a zone shadowed by slanted lines "sb".

It is thus to be noted that in the graph, a Good zone "OK" other than the zones shadowed by the slanted lines "SA" and "SB" is the zone where both good productivity and good oil discharging performance were obtained.

As is seen from the graph, the oil effective discharging (or oil discharging effect) becomes poor as the groove pitch "GP" increases, and the productivity is poor when the flatness ratio "FR" shows a high value.

By practically using the data represented by the graph of FIG. 5, the present invention is embodied.

That is, in the invention, the steel element 4 for the V-belt "V" is constructed to have the maximum value of flatness ratio "FR" that is available in the Good zone "OK" and have a value of the groove pitch "GP" that is permitted by the maximum value of flatness ratio "FR".

The features of the present invention will become much apparent from the following description.

The No-good range "SA" for productivity represents the range where production of desired combination of the raised portions 41 and the fine grooves 42 on the surface of the flank 4a is practically impossible due to the limitations of machining.

As is seen from the graph of FIG. 5, the No-good range "SA" for productivity increases as the groove pitch "GP" reduces. In other words, the Good range for productivity decreases as the groove pitch "GP" reduces.

The No-good range "SB" for oil effective discharging represents the range where the contact between the steel elements 4 and the drive or driven pulley 1 or 2 is made through a fluid lubrication.

As is seen from the graph of FIG. 5, the No-good range "SB" for oil effective discharging increases as the groove pitch "GP" increases. In other words, the Good range for oil effective discharging decreases as the groove pitch "GP" increases.

In the present invention, the flatness ratio "FR" takes a value larger than 70% and available in the Good zone "OK" and the groove pitch "GP" takes a value that corresponds to the value of the flatness ratio "FR". In the illustrated example of FIG. 5, the most desirable flatness ratio "FR" is about 83% that is the maximum value available in the Good zone "OK", and the groove pitch "GP" is about 0.1 mm that corresponds to 83% of the flatness ratio "FR".

Referring back to FIG. 4, there is shown an enlarged sectional view of a steel element 4 used in the V-belt "V" of the present invention. In the steel element 4, the width of the raised portion 41 (viz., WRP) is 0.08 mm and the width of the fine groove 42 (viz., WG) is 0.02 mm, and thus the sum of WRP and WG is 0.1 mm. Thus, the equation (1) provides the steel element 4 with a flatness ratio "FR" of 80%. The groove pitch "GP" is 0.1 mm. In the graph of FIG. 5, the point indicated by reference "D" is the point where the flatness ratio "FR" is 80% and the groove pitch "GP" is 0.1 mm.

As is seen from FIG. 4, in the steel element 4, each raised portion 41 has a rounded (or convex) surface. As shown, the rounded surface has the highest part in the middle portion thereof. A radius of curvature "R" of the rounded surface is so determined as to reduce the bearing pressure at edges of the raised portion 41 and increase a solid contact area of the raised portion 41. Furthermore, in this steel element 4, as is seen from FIG. 4, each raised portion 41 has a certain height "H" with respect to the edges of the raised portion 41. That is, each raised portion 41 has a projected round surface.

As shown in FIG. 4, in the steel element 4, each fine groove 42 has a generally V-shaped cross section and has a depth "D" of for example 0.01 mm.

In the following, operation of the metal V-belt "V" that includes the above-mentioned steel elements 4 will be described with the aid of the accompanying drawings.

First, for clarifying advantageous operation of the metal V-belt "V" of the invention, the reason why a high torque transmission is not effected by only increasing the solid-contact area of the steel element will be described with the aid of FIGS. 6A to 8B.

Figure 6A:
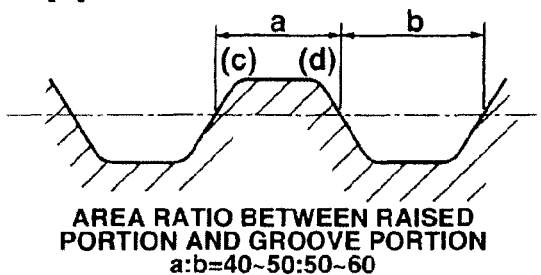
FIG. 6A is an enlarged sectional view of a flank of a known steel element.
Figure 6B:
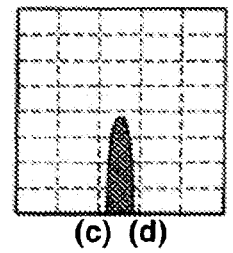
FIG. 6B is a graph showing bearing pressure distribution characteristics possessed by the known steel element of FIG. 6A.

In FIG. 6A, there is shown an enlarged sectional view of a flank of a known steel element that is new. FIG. 6B is a graph showing bearing pressure distribution characteristics possessed by the known steel element of FIG. 6A. FIG. 7A is a view similar to FIG. 6A, but showing the flank of the known steel element that has been subjected to a certain abrasion, FIG. 7B is a graph showing bearing pressure distribution characteristics possessed by the abraded known steel element of FIG. 7A. FIG. 8A is a view similar to FIG. 7A, but showing the flank of the known steel element that has been subjected to a much severe abrasion, and FIG. 8B is a graph showing bearing pressure distribution characteristics possessed by the severely abraded known steel element of FIG. 8A.

As is seen from FIG. 6A, in the known steel element that is new, the ratio of width "a" of the raised portion to width "b" of the fine groove is 40~50 to 50~60, and the groove pitch "GP" is 0.19 mm (=a+b). These dimensions are determined so as to satisfy a method through which the steel elements are produced with a certain product accuracy, and set with reference to a needed specification of the transmission, such as transmission torque, rotation speed of drive and driven pulleys, speed change range between the two pulleys and the like.

However, in the known steel element that is new, the raised portion tends to have at a center portion thereof an area that is subjected to an excessive bearing pressure as is seen from the graph of FIG. 6B. That is, under operation of an associated transmission, such area is forced to receive such excessive bearing pressure from the conical faces of the drive and driven pulleys. Thus, if, for meeting a need of a higher torque transmission, the transmission torque is increased without making any improvement to the metal V-belt and the drive and driven pulleys, the flank surface of each steel element shows a severe abrasion due to a partial concentration of the bearing pressure. That is, by such partial concentration of the bearing pressure, the flank surface is forced to receive an excessive bearing pressure from the drive and driven pulleys. When the abrasion of the flank surface is deteriorated, the depth of the fine groove is reduced, which inevitably induces a poor effect of the lubrication oil discharging by the fine groove. In this case, the contact between each steel element and each of the drive and driven pulleys is made through a fluid lubrication, which causes reduction in friction between the metal V-belt and each of the drive and driven pulleys.

As is seen from FIG. 7A, when the known steel element is subjected to a certain abrasion due to practical usage for a certain time, the ratio of width "a" of the raised portion to width "b" of the fine groove becomes 50~60 to 40~50. Of course, in this case, the groove pitch "GP" is unchanged, that is 0.19 mm (=a+b). In this abraded steel element, the raised portion tends to have at lateral edges thereof respective narrow areas that are subjected to an excessive bearing pressure as is understood from the graph of FIG. 7B.

Furthermore, as is seen from FIG. 8A, when the known steel element is subjected to a much severe abrasion due to a long practical usage thereof, the ratio of width "a" of the raised portion to width "b" of the fine groove becomes 80~90 to 10~20. Of course, also in this case, the groove pitch "GP" is left unchanged, that is 0.19 mm (=a+b). In this much severely abraded steel element, like in case of the above-mentioned abraded steel element of FIG. 7A, the raised portion tends to have at lateral edges thereof narrow areas that are subjected to an excessive bearing pressure as is understood from the graph of FIG. 8B. Due to reduction in depth of the fine groove, the lubrication oil discharging effect becomes poor.

The transition of the abrasion on the flank surface of the known steel element will be seen from the graph of FIG. 5.

That is, the characteristic of the known steel element (see FIG. 6A) that is new is plotted at point "A" in the graph of FIG. 5, the characteristic of the known steel element (see FIG. 7A) that is subjected to the certain abrasion is plotted at point "B" in the graph and the characteristic of the known steel element (see FIG. 8A) that is subjected to the much severe abrasion is plotted at point "C" in the graph.

As is understood from the graph of FIG. 5, the flatness ratio "FR" of the known steel element increases with increase of the degree of abrasion of the flank surface. However, the groove pitch "GP" (=0.19 mm) is kept unchanged irrespective of variation of the flatness ratio "FR". As is seen from the graph, both the points "A" and "B" for the new known steel element (see FIG. 6A) and abraded known steel element (see FIG. 7A) are placed in the Good zone "OK".

It is however to be noted that the point "C" for the severely abraded known steel element (see FIG. 8A) is not placed in the Good zone "OK". More specifically, the point "C" is placed in the Good range for productivity but placed in the No-good range "SB" for oil effective discharging. This means that although the severely abraded known steel element shows the flatness ratio of about 80% and thus satisfies a need of higher torque transmission, the steel element fails to exhibit a satisfied oil discharging effect.

From the above description directed to the abrasion of the known steel element, it has been revealed that even when the solid contact area of a steel element is increased by increasing the flatness ratio "FR" of the flank surface, a higher torque transmission is not obtained if the groove pitch "GP" is left unchanged.

Next, description will be directed to the measures by which a higher torque transmission is achieved by increasing the solid contact area of a steel element and optimizing the groove pitch "GP".

FIG. 9 is a graph showing a relationship between a solid contact area and a coefficient of friction.

As is mentioned hereinabove, in the steel element 4 (see FIG. 4) of the present invention, the flatness ratio "FR" is set to 80% and the groove pitch "GP" is set to 0.1 mm, which are plotted at the point "D" in the graph of FIG. 5. As is seen from the graph, the point "D" is placed in the Good zone "OK" for both productivity and oil discharging effect. As is seen from the graph, the groove pitch "GP" of 0.1 mm, which is indicated by the point "D", satisfies the effective oil discharging.

Accordingly, in the steel element 4 for the V-belt "V" of the present invention, the area of each raised portion 41 that actually contacts the conical surfaces 11a and 12a of the drive pulley 1 and the conical surfaces 21a and 22a of the driven pulley 2 is increased. Because of increase in the contact area of each raised portion 41 against the drive and driven pulleys 1 and 2, the bearing pressure at the raised portion 41 is reduced. Due to reduction in the bearing pressure, undesired abrasion on the surface of the flank 4a is reduced even when the higher torque transmission is carried out. This brings about a long effective usage of the fine grooves 42 that are arranged with a pitch of 0.1 mm. That is, the oil discharging effect by the fine grooves 42 is kept for long time.

As is seen from the graph of FIG. 9, with increase of the solid contact area, the coefficient of friction of the area increases, which assures the torque transmission from the drive pulley 1 to the metal V-belt "V" and from the metal V-belt "V" to the driven pulley 2.

Accordingly, when the metal V-belt "V" of the present invention is kept traveled by the drive and driven pulleys 1 and 2, the torque transmission between the flanks 4a of the steel elements 4 and each of the drive and driven pulleys 1 and 2 is suitably controlled by the oil discharging effect possessed by the fine grooves 42. That is, in the present invention, the coefficient of friction of the steel element 4 against the conical faces of the drive and driven pulleys 1 and 1 is increased, and thus, the transmission torque (viz., the torque to be transmitted) can be increased.

The above description is much clearly understood from the following description.

A force "Fs" with which the metal V-belt is compressed by a pulley (viz., drive or driven pulley) for transmitting a torque to the pulley is represented by the following inequality.

$$Fs > (K \times T \times \cos \alpha)/2\mu R \quad (2)$$

wherein:
Fs: compression force by a pulley
K: safety factor to a belt slipping
T: transmission torque
α: angle of conical face of the pulley (or sheave angle)
μ: coefficient of friction between a steel element and the pulley
R: running radius of the steel element From the above inequality (2), it is apparent that when the coefficient of friction between the steel element 4 and the pulley 1 or 2 increases, establishment of the inequality (2) is kept by increasing the transmission torque. In other words, when the coefficient of friction increases, much larger torque can be transmitted.

Next, an initial abrasion reduction effect possessed by the projected round surface of the raised portion 41 will be described in the following with the aid of the drawings.

Figure 10A:
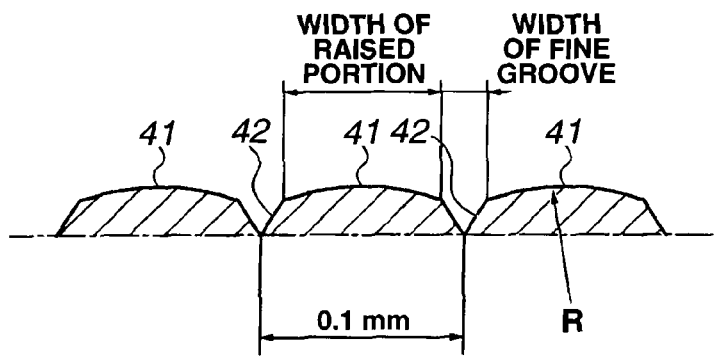
FIG. 10A is an enlarged sectional view of a flank of the steel element of the V-belt of the present invention.
Figure 10B:
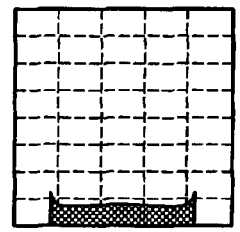
FIG. 10B is a graph showing bearing pressure distribution characteristics possessed by the steel element of FIG. 10A.

In FIG. 10A, there is shown an enlarged sectional view of a flank of the steel element 4 of the V-belt of the present invention. The steel element 4 shown in the drawing is new one. FIG. 10B is a graph showing bearing pressure distribution characteristics possessed by the new steel element 4.

Figure 11:
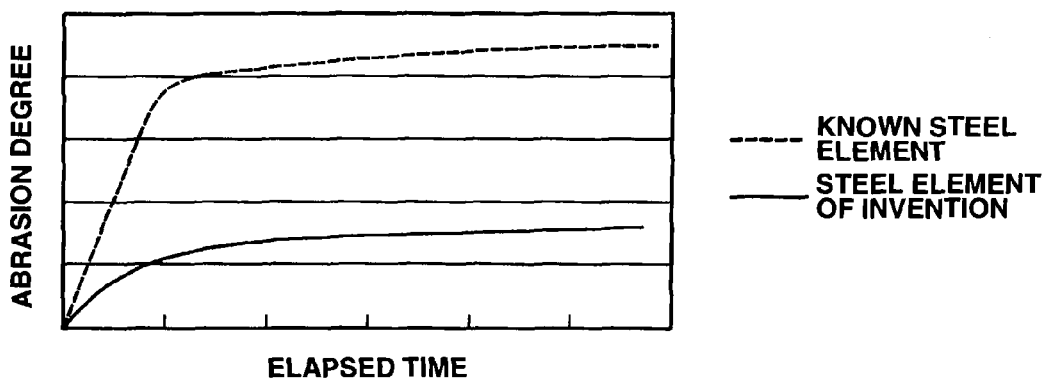
FIG. 11 is a graph showing a relationship between an elapsed (or service) time and an abrasion degree of flank surface in both the known steel element and the steel element of the present invention.

For examining a resistance of the steel element 4 of the invention against abrasion, an abrasion resistance test was carried out of which results are shown in the graph of FIG. 11 by a solid line. For comparison, the data of a known steel element is also shown in the graph, which is indicated by a broken line.

In the abrasion resistance test, test pieces for the steel element 4 and those for a known steel element were assembled to constitute two V-belts and these two V-belts were installed in a known continuously variable transmission in turn. In the graph of FIG. 11, the horizontal axis represents an elapsed (or service) time and the horizontal axis represents a degree of abrasion of the flank surface.

As is seen from the graph of FIG. 11, in both the steel element 4 of the invention and the known steel element, the abrasion of the flank surface increased with increase of elapsed (service) time. Furthermore, in both the steel elements, an abrasion rate (or abrasion speed) was high at an early stage of the elapsed time, but low at a later stage of the time.

This is because until a certain early stage of the elapsed time, a rough surface possessed by the flank of a new steel element is easily abraded, and once the rough surface is sufficiently abraded and thus polished by the conical faces of the drive and driven pulleys, the abrasion rate becomes reduced with the aid of a protective membrane of the lubrication oil put between the flank surface of the steel element and the conical faces of the drive and driven pulleys. It is said that once the amount of the abrasion becomes equal to that of the protective membrane, the abrasion of the flank surface is settled. It is also said that the threshold for the settlement of the abrasion is determined by a size of the contact area through which the flank surface and the conical faces of the drive and driven pulleys contact.

It is now to be noted that the graph of FIG. 11 reveals that the abrasion degree of the steel element 4 of the present invention is sufficiently small as compared with that of the known steel element.

That is, as is seen from FIG. 10A, in the steel element 4 for the V-belt "V" of the present invention, each raised portion 41 of the flank (4a) has a rounded surface. As is seen from the graph of FIG. 10B, such raised portion 41 allows the edges thereof to have a sufficiently reduced bearing pressure. That is, each raised portion 41 has a sufficiently low bearing pressure throughout the entire surface thereof. FIG. 11 clearly shows the advantages possessed by the steel element 4 for the V-belt "V" of the present invention.

Figure 12:
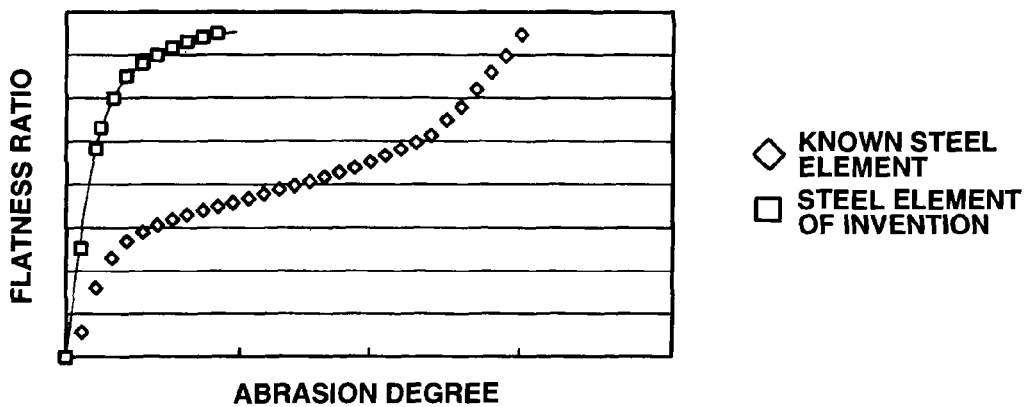
FIG. 12 is a graph showing a relationship between the abrasion degree of flank surface and a flatness ratio of flank surface in both the known steel element and the steel element of the present invention.

As is seen from the graph of FIG. 12, in the steel element 4 for the V-belt "V" of the present invention, a sufficiently high flatness ratio "FR" is obtained even when the abrasion degree of the flank surface is not so high unlike the case of the known steel element. In other words, in the steel element 4, sufficiently high flatness ratio "FR" is obtainable in a low abrasion degree of the flank surface, as compared with the known steel element.

Accordingly, in the present invention, undesired remarked abrasion of the flank surface, which would occur in the known steel element at an early stage of the service time, is suppressed or at least minimized, and furthermore, because of increase of the contact area of the raised portion 41 at the early stage of the service time, the friction coefficient of the V-belt "V" of the invention relative to the drive and driven pulleys is increased.

Next, description will be directed to an improvement in fuel consumption of an associated motor vehicle due to increase of the solid contact area of the steel element 4, the optimum groove pitch "GP" and the rounded surface possessed by each raised portion 41.

As is described hereinabove, due to increase of the solid contact area of the steel element 4 and the optimum groove pitch "GP", the friction coefficient "μ" of the V-belt "V" relative to the conical faces of the drive or driven pulley is increased.

In the following, secondary effects of the increased friction coefficient "μ" will be described.

As will be understood from the above inequality (2), if, with the needed transmission torque kept constant, the friction coefficient "μ" is increased, the compression force by the pulley is reduced. In other words, if the friction coefficient "μ" is increased, a needed torque transmission can be carried out with a reduced compression force by the pulley.

That is, due to increase of the friction coefficient "μ", a clamp force applied to the V-belt "V" from the pulley can be reduced, and due to reduction of the clamp force by the pulley, needed thrust of the pulley can be reduced, and due to reduction of the needed thrust of the pulley, the load of an oil pump (which produces a hydraulic power for controlling the thickness of the drive or driven pulley) can be reduced, and due to reduction of the load of the oil pump, the fuel consumption of an associated motor vehicle is reduced. More specifically, due to increase of the friction coefficient "μ", the hydraulic power applied to the slidable discs 12 and 22 of the drive and driven pulleys 1 and 2 can be reduced and thus, the fuel consumption of the motor vehicle is reduced or improved.

As is described hereinabove, in the steel element 4 for the V-belt "V" of the present invention, each raised portion 41 has a rounded (or convex) surface, and thus the solid contact area of the raised portion 41 is increased at a relatively early stage of the service time inducing early enlargement of the friction coefficient "μ". Accordingly, the hydraulic power applied to the slidable discs 12 and 22 of the drive and driven pulleys 1 and 2 can be reduced at an early stage of the service time, which induces improvement in the fuel consumption of an associated motor vehicle.

In the following, modifications of the present invention will be described.

In the foregoing, the description is directed to the steel element 4 that has at each flank 4a raised portions 41 each having a rounded (or convex) surface. If desired, the rounded surface may be part of an ellipse, or may have a flat top at a middle portion thereof.

In the foregoing, each of the fine grooves 42 provided by the flank surface 4a of the steel element 4 is described to have a generally V-shaped cross section (see FIG. 4). However, if desired, such fine groove may have a semi-circular cross section or the like so long as the selected shape assures a satisfied lubrication oil discharging effect.

In the foregoing, the V-belt "V" of the present invention is described to be used in a continuously variable transmission mounted in a motor vehicle powered by an internal combustion engine. However, if desired, the V-belt "V" of the invention may be used in the transmission mounted in a hybrid motor vehicle, electric motor vehicle or the like.

The entire contents of Japanese Patent Application 2008-124230 filed May 12, 2008 are incorporated herein by reference.

Although the invention has been described above with reference to the embodiment of the invention, the invention is not limited to such embodiment as described above. Various modifications and variations of such embodiments may be carried out by those skilled in the art, in light of the above description.

What is claimed is:

1. A metal V-belt for transmitting torque between two pulleys of a belt-type continuously variable transmission, each of the two pulleys having a V-shaped groove, the metal V-belt comprising:
two parallelly extending laminated steel bands; and
a plurality of identical steel elements, each having at opposed sides of the steel element tapered flanks that are configured to contact conical faces of the two pulleys,
wherein each of the two parallelly extending laminated steel bands is positioned in an opposed groove of each of the steel elements, such that when a torque transmission occurs between the two pulleys having the metal V-belt tightly between the two pulleys, a force for biasing the steel elements radially outward from each of the two pulleys is supported by the two parallelly extending laminated steel bands, and a force for pressing the steel elements toward one another is supported by the steel elements,
wherein each of the tapered flanks includes raised portions that contact the conical faces of each of the two pulleys through an oil layer, and grooves that discharge lubrication oil in a circumferential direction of each of the two pulleys, wherein the raised portions successively alternate with the grooves,
wherein a flatness ratio comprising a ratio of the width of one of the raised portions to a sum of the width of one of the raised portions and the width of one of the grooves and the ratio multiplied by one-hundred equals a set flatness ratio within a flatness ratio range that allows for production of the raised portions and grooves in a geometrical shape,
wherein a groove pitch comprising a distance between two of the grooves equals a value within a range of values that allows for production of the grooves in the geometrical shape and oil discharging from the grooves, wherein the range allows for both the production in the geometrical shape and the oil discharging from the grooves while satisfying the set flatness ratio,
wherein each of the raised portions is a rounded surface having a first edge portion, a second edge portion and a middle portion between the first and second edge portions, wherein a height of the middle portion is greater than a height of the first and second edge portions, and wherein each of the grooves comprises a V-shaped cross-section.

2. The metal V-belt of claim 1, wherein the set flatness ratio is higher than 70%, and wherein the groove pitch is set to a corresponding value.

3. The metal V-belt of claim 2, wherein the set flatness ratio is 80%, and wherein the groove pitch is set to 0.1 mm.

4. The metal V-belt of claim 1, wherein a radius of curvature of the rounded surface is configured to reduce a bearing pressure at the first and second edge portions of the raised portion and increase a solid contact area of the raised portion.

5. The metal V-belt of claim 1, wherein the set flatness ratio is 83%, and wherein the groove pitch is set to 0.1 mm.

6. A metal V-belt for transmitting torque between two pulleys of a belt-type continuously variable transmission, each of the two pulleys having a V-shaped groove, the metal V-belt comprising:

two parallelly extending laminated steel bands; and
a plurality of identical steel elements, each having at opposed sides of the steel element tapered flanks that are configured to contact conical faces of the two pulleys,
wherein each of the two parallelly extending laminated steel bands is positioned in an opposed groove of each of the steel elements,
wherein each of the tapered flanks includes raised portions that contact the conical faces of each of the two pulleys through an oil layer, and grooves that discharge lubrication oil in a circumferential direction of each of the two pulleys, wherein the raised portions successively alternate with the grooves,
wherein a flatness ratio comprising a ratio of the width of one of the raised portions to a sum of the width of one of the raised portions and the width of one of the grooves and the ratio multiplied by one-hundred equals a set flatness ratio within a flatness ratio range,
wherein a groove pitch comprises a distance between two of the grooves,
wherein each of the raised portions is a rounded surface having a first edge portion, a second edge portion and a middle portion between the first and second edge portions, wherein a height of the middle portion is greater than a height of the first and second edge portions, and
wherein each of the grooves comprises a V-shaped cross-section.

7. The metal V-belt of claim 6, wherein the set flatness ratio is higher than 70%, and wherein the groove pitch is set to a corresponding value.

8. The metal V-belt of claim 7, wherein the set flatness ratio is 80%, and wherein the groove pitch is set to 0.1 mm.

9. The metal V-belt of claim 6, wherein the set flatness ratio is 83%, and wherein the groove pitch is set to 0.1 mm.

10. A metal V-belt for transmitting torque between two pulleys of a belt-type continuously variable transmission, each of the two pulleys having a V-shaped groove, the metal V-belt comprising:

two parallelly extending laminated steel bands; and
a plurality of identical steel elements, each having at opposed sides of the steel element tapered flanks that are configured to contact conical faces of the two pulleys,
wherein each of the two parallelly extending laminated steel bands is positioned in an opposed groove of each of the steel elements, such that when a torque transmission occurs between the two pulleys having the metal V-belt tightly between the two pulleys, a force for biasing the steel elements radially outward from each of the two pulleys is supported by the two parallelly extending laminated steel bands, and a force for pressing the steel elements toward one another is supported by the steel elements,
wherein each of the tapered flanks includes raised portions that contact the conical faces of each of the two pulleys through an oil layer, and grooves that discharge lubrication oil in a circumferential direction of each of the two pulleys, wherein the raised portions successively alternate with the grooves,
wherein a flatness ratio comprising a ratio of the width of one of the raised portions to a sum of the width of one of the raised portions and the width of one of the grooves and the ratio multiplied by one-hundred equals a set flatness ratio within a flatness ratio range, the set flatness ratio achieving a given effective discharging of lubrication oil, the set flatness ratio being in the flatness ratio range greater than 70% and up to 83%,
wherein a groove pitch comprises a distance between two of the grooves, the groove pitch set according to the set flatness ratio to achieve the given effective discharging of lubrication oil, and
wherein each of the raised portions is a rounded surface having a first edge portion, a second edge portion and a middle portion between the first and second edge portions, wherein a height of the middle portion is greater than a height of the first and second edge portions.

11. The metal V-belt of claim 10, wherein the groove pitch is less than 0.19 mm.

12. The metal V-belt of claim 10, wherein the set flatness ratio is 80%, and wherein the groove pitch is set to 0.1 mm.

13. The metal V-belt of claim 10, wherein the set flatness ratio is 83%, and wherein the groove pitch is set to 0.1 mm.

* * * * *